Aug. 31, 1948. P. J. OVREBO 2,448,044
HIGH RADIO FREQUENCY WATTMETER
Filed Dec. 23, 1944 2 Sheets-Sheet 1

INVENTOR.
PAUL J. OVREBO
BY
William D. Hall
ATTORNEY

Aug. 31, 1948.  P. J. OVREBO  2,448,044
HIGH RADIO FREQUENCY WATTMETER
Filed Dec. 23, 1944  2 Sheets-Sheet 2

INVENTOR.
PAUL J. OVREBO
BY William D. Hall.
ATTORNEY

Patented Aug. 31, 1948

2,448,044

UNITED STATES PATENT OFFICE 2,448,044

HIGH RADIO-FREQUENCY WATTMETER

Paul J. Ovrebo, Dayton, Ohio

Application December 23, 1944, Serial No. 569,571

17 Claims. (Cl. 171—95)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to high radio-frequency watt-meters. The output of a radio-frequency transmitter or generator is fed through a coaxial line, of desired impedance, to a thermocouple and attenuating cable with appropriate terminating resistor which is shunted across a calibrated indicating instrument, whose function is to measure the D. C. current or D. C. E. M. F. set up by the thermocouple. This current or E. M. F. is a measure of the radio frequency power or radio frequency voltage of the radio frequency source.

An object of the invention is to measure the radio frequency power output of a transmitter or other radio frequency generator, or to measure the power made available at any place in a circuit. A further object of the invention is to measure the radio frequency voltage of a transmitter or other radio frequency generator, or the potential difference available at any place in a circuit.

A further object of the invention is to provide a means, by a high-loss line and a terminating resistor, whereby radio frequency energy may be continuously or intermittently dissipated while the source of radio frequency energy is in operation or is being tested, modified or repaired.

It is a further object of this invention to provide a sensitive means of measuring the power output, or voltage output, or current output of a radio frequency transmitter or generator while the same is in operation, or is being tested, modified or repaired.

These and other objects will appear through the specification and will be pointed out in the claims.

The measurement of radio-frequency output, in the form of power, voltage or current, is very desirable for control purposes. Since the output of radio frequency transmitters and generators involves energy, it is necessary that means be provided for the dissipation of this energy without injury to the prime source, or the measuring equipment. It is likewise important to prevent this energy from being radiated in the form of radio waves in sufficient amounts to cause interference or to betray the source as to location, frequency or other characteristic.

A novel feature of this device is that a cooling airblast is provided to aid in the dissipation of the heat produced by the attenuation of the radio frequency energy.

This new radio frequency wattmeter is easily adaptable to the measurement of power, voltage and current from radio frequency transmitters or other radio frequency generators up to 1500 megacycles, with power outputs between 2 and 500 watts, whether such transmitters or generators be inductively or capacitatively coupled. It is further anticipated that by substitution of a more sensitive current meter and with the addition of coaxial cable to the attenuating line, which has low attenuation at the medium and normally high frequencies, and an effective amount of attenuation at the very high frequencies, both very low powers and very high frequencies may be added to the above range of effectiveness.

A further feature of the invention is that the wattmeter requires no matching section and measures power or the related quantities in terms of the deflection of a 0–1, D. C. milliammeter or other sensitive meter. At very high frequencies, the radio frequency energy is completely attenuated by the high-loss coaxial cable, while at the medium high and low frequencies the attenuation is accomplished by both the high-loss cable and the terminating resistor. At the low and very low frequencies, the attenuation is accomplished almost entirely by the terminating resistor. With the addition of low loss cable, the attenuation of the very high radio frequencies can be accomplished over a reasonable length of cable instead of a very short length of high loss cable.

Referring to the drawings wherein like numerals denote like parts,

Figure 6:
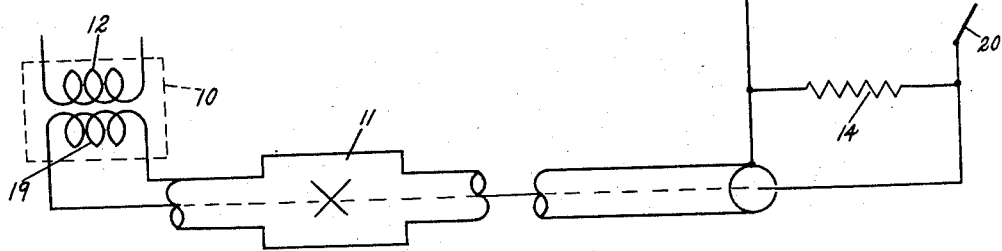
Fig. 6 is a schematic diagram view of the wattmeter circuit employing inductive coupling to a transmitter.
Figure 7:
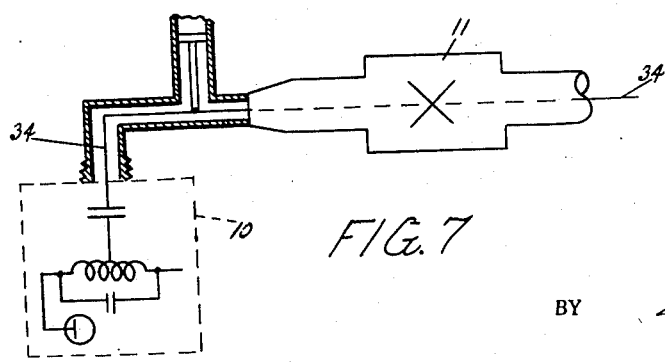

Fig. 7 is a similar view to that of Fig. 6 employing capacitative coupling to the transmitter and using a shorting bar tuner so as to provide a D. C. return circuit for the thermocouple current and at the same time provide a radio frequency open circuit so as not to disturb the circuit. The shorting bar tuner can be set for different frequencies.

Thermocouple ammeter circuit

The signal from the transmitter 10 is fed inductively to the coaxial cable and to the thermocouple 11 through coupling transformer 12. The thermocouple is preferably removably connected into the loss-line by screw couplings so that it is easily replaceable with other thermocouples of the same or different sensitivity so as to provide the desired sensitivity range to measure power, voltage or current. The thermocouple is preferably made a part of the central conductor of the coaxial cable. However, it may under special circumstances be made a part of the outer conductor. The thermocouple may be of any type, but is preferably to be of a coaxially, impedance matched type, whose thermocouple element consists of ½ inch lengths of Nichrome and constantin or equivalent, with silver soldered twisted joints, matched to the standard by means of clipping the lengths of the twist. The thermocouple 11 is connected into the high-loss line 13, preferably 100 feet in length for field use, and of longer lengths for more precise laboratory or test work. This line is terminated in a 50 ohm resistor when the impedance of the loss-line and connecting coaxial cable is 50 ohms. It is preferably to be of the same value as the impedance of the line, as chosen for the impedance of the transmitter or generator. At high frequencies, most of the radio frequency power is dissipated in this high-loss line, while in the case of lower frequencies, less power is dissipated in the line and more in the 50 ohm resistor 14.

The direct current which is produced by the thermocouple, by means of the well known temperature-differential principle for metals of different thermo-electric power, increases with the power output of the transmitter. The high-loss line 13 forms a closed circuit through its outer and central coaxial conductors since it is actually a coaxial-type cable. In this circuit are contained a network including the secondary coil 19 of the transmitter coupling transformer 12, terminating resistor 14, a pair of choke coils 15 and 16, a capacitor 17 and a milliammeter, or microammeter or similar D. C. measuring instrument 18. Milliammeter or microammeter 18 may be in series with the capacitor, or capacitor 17 is shunted across the filtering choke coils 15 and 16. In the latter case the resulting network is such that any residual radio frequency current is prevented from reaching the meter 18, which then measures only the D. C. output current of the thermocouple 11. The direct current sets up a drop in potential across the terminating resistor 14. This drop in potential or current is measured by the meter 18 which may be calibrated in terms of radio-frequency power, voltage or current.

Blower circuit

Tapped into the power line feeding the transmitter, but preferably separate from the loss-line circuit, is a blower and pilot light circuit. This circuit is broken by motor switch 21. When the circuit is closed, motor 22 and pilot lamp 23 are energized. The unit is so constructed, as will be hereinafter described, that the motor drives a turbo-fan or blower for forcing air around the loss-line cable 13 to dissipate the heat generated therein by the passage of the transmitter output current.

Figure 1:
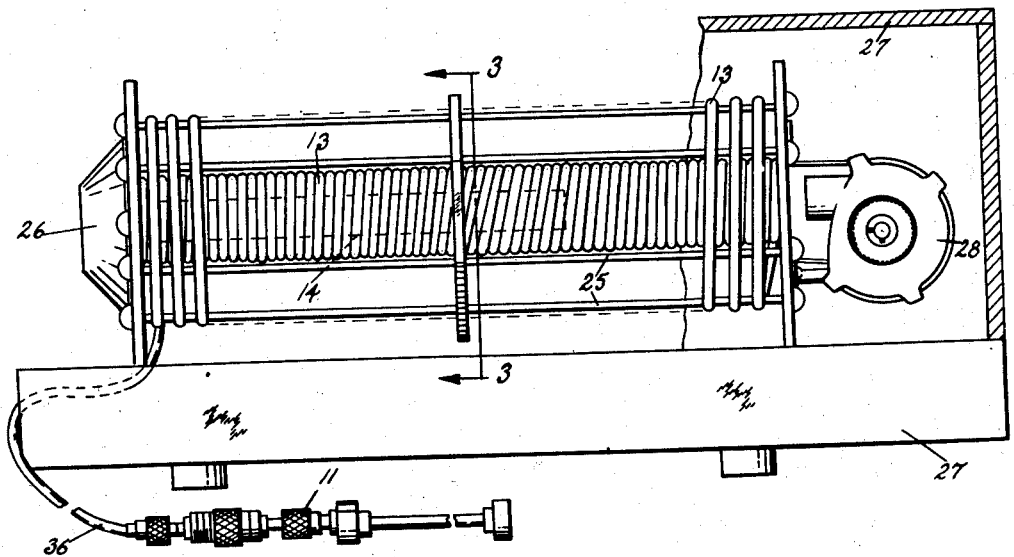
Fig. 1 is a vertical elevation of the wattmeter with the cover housing cut away to show the loss-line and blower arrangement. The loss-line is partially shown to reveal the core structure.
Figure 2:
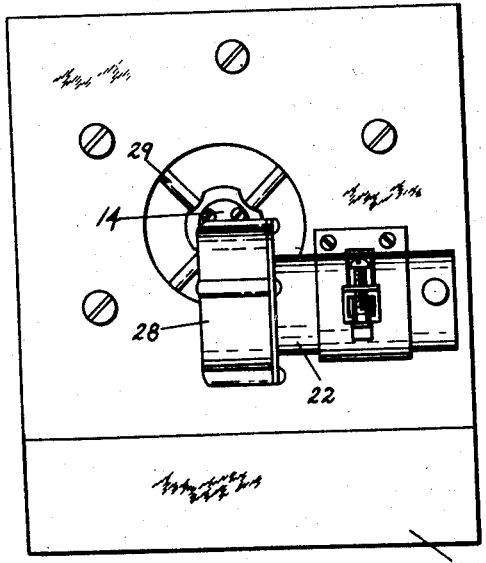
Fig. 2 is a right end elevation of the wattmeter shown in Fig. 1.
Figure 3:
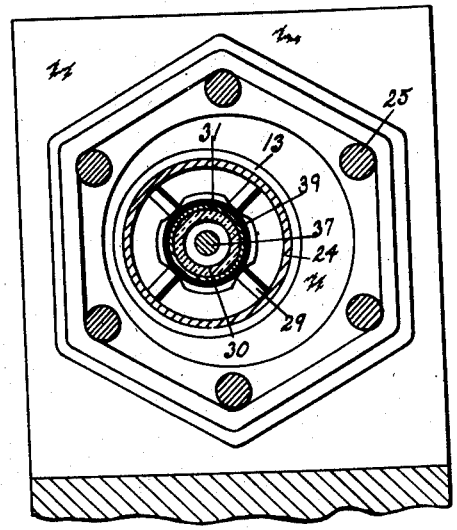
Fig. 3 is a sectional view of the wattmeter taken on the line 3—3 of Fig. 1.

The blower 28 is shown in Fig. 1 as mounted opposite the resistor 14, which is enclosed in the inner core 24 and spaced therefrom by spacers 29.

Figure 4:
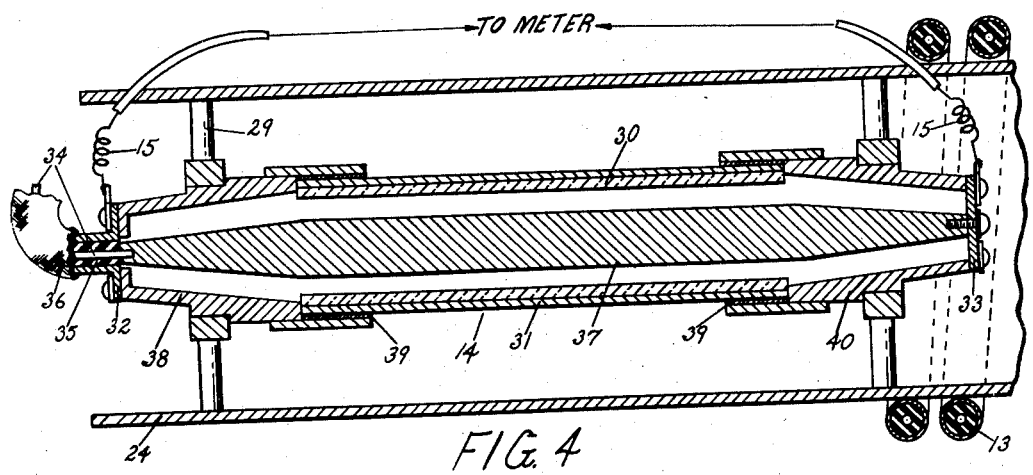
Fig. 4 is an enlarged cross-sectional fragmentary view of the resistor and inner core shown in Fig. 1.
Figure 5:
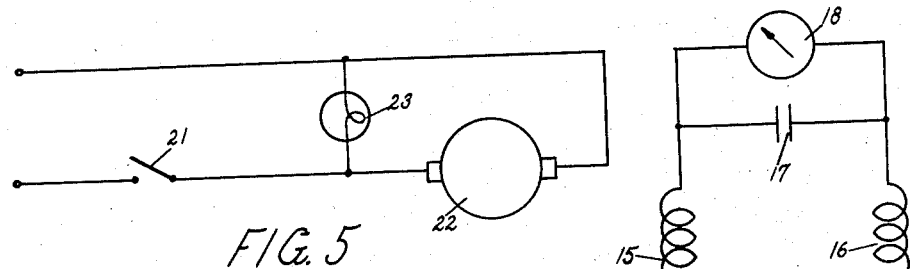
Fig. 5 is a schematic diagram view of the blower and pilot lamp circuit.

The resistor 14, shown in cross-section in Fig. 4, is preferably a ceramic tube 30 having on its outer surface a resistive carbon coating 31. Plugs 32 and 33 close the ends of the ceramic tube 30, and form contact with the carbon coating 31. The central conductor 34 of the loss line 13 extends, together with the dielectric coating 35, through the hollow bore of plug 32 so that it is insulated from plug 32 but forms electrical contact with plug 33, through a taper-ended connector bar 37, the electrical circuit being completed from cable sheath conductor 36 to plug 32, to interiorly tapered terminating plug 38, to silver coating 39 and carbon coating 31, silver coating 39, to plug 40 and 33, and then to inner coaxial conductor 34 through taper bar 37. The carbon coating 31 thereby forms a considerable resistive surface between inner and outer conductors of the loss-line, and will emit considerable heat, which is driven out of inner core 24 by blower 28. Connector bar 37 has its ends tapered to match the tapered bores of plugs 38 and 40 to minimize standing waves.

The loss line 13 is helically wound about a pair of coaxial cores, the inner core 24 being sufficiently smaller in diameter than the outer core or frame 25 that an air space will be formed between the two helices of coiled loss-line. At one end of the inner core 24 there is provided preferably the terminating resistor 14, and at the other end the motor-driven turbo-fan 22 for creating a constant blast of cooling air through the inner core 24. A baffle 26 at the opposite end of inner core 24, and spaced therefrom, reverses the flow of cooling air and directs it into and through the outer core, across both coils of loss-line, and then out of the housing 27 which houses the component parts of the complete wattmeter.

Since the various parts of the meter which are subject to resistive heating are contained within the housing, they are thereby exposed to the air blast and cooled to a temperature sufficiently low to avoid disintegration from excessive heating. The cores 24 and 25 may be made of tubular materials with or without perforated walls, or they may be made of a series of radially and circumferentially spaced rods 25, the object being to provide a foundation over which to wind the long length of loss-line so that it will be most advantageously exposed to a blast of cool air.

There is thus provided a compact arrangement employing a cooled loss-line which permits spacing of the sensitive milliammeter at a distance from the line and thermocouple heat so that it may be mounted anywhere on the housing 27. The novel construction permits also the use of the same transmission line to transmit D. C. to the milliammeter and to dissipate the radio frequency energy at all frequencies. This construction eliminates the difficulty of filtering out the radio-frequency current where separate leads are provided from the meter to each of the thermocouple elements. In addition to these advantages the thermocouple elements may be removed and replaced in the lead line at will without necessitating impedance-adjusting any part of the circuit, or of tuning the line to resonate at the different frequencies being tested.

While the invention has been illustrated and described in its preferred embodiment, it is contemplated that changes in the details, materials, form, and construction thereof may be made without departing from the spirit or scope of the invention as claimed.

What I claim is:

1. A radio-frequency wattmeter including an electrical loss-line conductor adapted for connection to a source of radio frequency energy, and ventedly mounted in a confined area, an electrical resistor interiorly proportioned and shaped at its opposite termini to minimize standing waves, a thermocouple, and a current measuring milliammeter and, in a separate circuit, a cooling blower, said blower being mounted so as to continuously force a blast of cooling air across the loss-line, thermocouple and resistor while measuring current.

2. A radio frequency wattmeter comprising means for dissipating the input current, thermocouple means for generating a measurable electromotive force, a coaxial element resistor having matched taper terminations to provide a low standing wave characteristic for dissipating the input current in addition to said first-mentioned dissipating means, means for measuring said electromotive force, and cooling means for dissipating the resistive heat of the input current.

3. A radio-frequency wattmeter comprising a predetermined length of loss-line coaxial electrical conductor helically wound over a hollow core, and adapted to be connected at its input end to a source of radio-frequency current; a resistor interiorly proportioned and shaped at its opposite termini to minimize standing waves at the output end of said line to further dissipate currents passed by said loss line, a milliammeter connected between the inner and outer conductors of said loss line, and a thermocouple connected into the inner conductor of said loss line and milliammeter for generating an electromotive force or current in direct ratio to the power input to said loss line.

4. A radio frequency wattmeter comprising a predetermined length of loss-line coaxial cable helically wound over a pair of spaced coaxial cores suitably baffled to provide air ducts for forced draft to facilitate cooling, inductive coupling means for coupling said line to the output of a radio frequency transmitter, said line circuit including a loss line resistor for power dissipation in addition to the loss line dissipation, a thermocouple, a sensitive meter for measuring the thermocouple-generated direct current, inductance and capacitance means across which said sensitive meter is shuntedly connected, for filtering out radio frequency current from the direct current being measured, and cooling means directing a blast of air around said line.

5. A radio frequency wattmeter comprising housing means, supporting means contained in said housing means, high-loss line means wound on said supporting means, thermocouple means incorporated in said line means, means terminating said line means in its characteristic impedance, and blower means for cooling said line means and said terminating means.

6. A radio frequency wattmeter comprising housing means, supporting means contained in said housing means, high-loss line means wound on said supporting means, thermocouple means incorporated in said line means, means terminating said line means in its characteristic impedance, metering means for measuring direct-current flow in said terminating means, filtering means connected between said terminating means and said metering means, and blower means for cooling said line means and said terminating means.

7. A radio frequency wattmeter comprising housing means, supporting means contained in said housing means, high-loss line means wound on said supporting means, thermocouple means incorporated in said line means, means terminating said line means in its characteristic impedance, metering means for measuring the direct-current potential across said terminating means, filtering means connected between said terminating means and said metering means, and blower means for cooling said line means and said terminating means.

8. A radio frequency wattmeter comprising a housing, a plurality of supports coaxially arranged in said housing, a high-loss line wound on said supports forming coaxial layers, a thermocouple incorporated in said line and a resistor terminating said line in its characteristic impedance.

9. A radio frequency wattmeter as set forth in claim 8, wherein said line is helically wound on said supports.

10. A radio frequency wattmeter as set forth in claim 8, wherein said line forms a plurality of helices, said supports being the cores of said helices.

11. A radio frequency wattmeter comprising a housing, a plurality of core forming means contained in said housing, said cores being coaxially related, a high-loss coaxial line helically wound on said cores forming a plurality of coaxial helices, thermocouple means incorporated in said line, and a resistor terminating said line in its characteristic impedance.

12. A radio frequency wattmeter comprising a housing containing a first core forming means and at least a second core forming means, said second core having a diameter greater than said first core, said cores being coaxially related, a high-loss coaxial line helically wound on said cores and forming inner and outer serially connected coaxial helices, thermocouple means incorporated in the inner conductor of said line, and a resistor terminating said line in its characteristic impedance, said resistor being disposed within said first core.

13. A radio frequency wattmeter comprising a housing containing a first core forming means and at least a second core forming means, said second core having a diameter greater than said first core, said cores being coaxially related, a high-loss coaxial line helically wound on said cores and forming inner and outer serially connected coaxial helices, said helices being spaced from each other and forming an air passage, thermocouple means incorporated in the inner conductor of said line, a resistor terminating said line in its characteristic impedance, said resistor being disposed within said first core, a baffle spaced from one end of said first core, and blower means directed into the other end of said core whereby cooling air forced through said first core, over said resistor, is reversed by said baffle to flow through said passage.

14. In a radio frequency wattmeter comprising a high-loss coaxial line and a thermocouple in said line, means terminating said line comprising a ceramic cylinder, a resistive coating on the exterior surface of said cylinder, a first and a second conductive plug, each of said plugs closing one end of said cylinder and contacting said coating, a conductive bar disposed interior of said cylinder and plugs and coaxial therewith, conductive means between one end of said bar and said first plug, the other end of said bar being insulated from said second plug, and means insulated from said second plug for connecting the inner conductor of said line to the latter end of said bar, the outer conductor of said line being connected to said second plug.

15. In a resistor as set forth in claim 14, wherein said resistive coating is of carbon, a silver coating connecting said carbon coating and said plugs.

16. In a resistor as set forth in claim 14, wherein said plugs are interiorly tapered, said bar being tapered at each end to conform with the interior of said plugs whereby the generation of standing waves is minimized.

17. In a radio frequency wattmeter wherein a meter measures the current generated by a thermocouple incorporated in the inner conductor of a coaxial line, and wherein the magnitude of said current is responsive to the radio frequency power introduced in said line, the combination with said thermocouple, meter and line of a plurality of core forming means, a plurality of helices formed by said line wound on said core forming means, means terminating said line in its characteristic impedance, and blower means for cooling said helices and said terminating means.

PAUL J. OVREBO.

REFERENCES CITED

The following references are of record in the file of this patent:

UNITED STATES PATENTS

| Number | Name | Date |
| --- | --- | --- |
| 1,866,611 | Affel | July 12, 1932 |
| 2,158,875 | Leeds | May 16, 1939 |
| 2,262,134 | Brown | Nov. 11, 1941 |
| 2,284,379 | Dow | May 26, 1942 |
| 2,291,428 | Wolf | July 28, 1942 |
| 2,294,881 | Alford | Sept. 8, 1942 |